United States Patent
Inomoto et al.

(10) Patent No.: US 8,953,249 B2
(45) Date of Patent: Feb. 10, 2015

(54) METHOD OF MANUFACTURING AN APODIZER, AND OPTICAL MODULE

(71) Applicant: Kabushiki Kaisha Toshiba, Tokyo (JP)

(72) Inventors: Minoru Inomoto, Yokohama (JP);
Yusaku Konno, Yokohama (JP);
Naotada Okada, Yokohama (JP);
Takayuki Ogasahara, Yokohama (JP);
Katsuo Iwata, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 92 days.

(21) Appl. No.: 13/833,285

(22) Filed: Mar. 15, 2013

(65) Prior Publication Data

US 2013/0329303 A1    Dec. 12, 2013

(30) Foreign Application Priority Data

Jun. 8, 2012    (JP) .................................. 2012-130955

(51) Int. Cl.
*G02B 7/00*    (2006.01)
*G02B 25/00*    (2006.01)

(52) U.S. Cl.
USPC .......................................... 359/642; 359/644

(58) Field of Classification Search
USPC .................. 359/642–646, 227, 387
See application file for complete search history.

(56) References Cited

U.S. PATENT DOCUMENTS

| 3,843,235 | A |   | 10/1974 | Mino et al. |
| 6,137,632 | A | * | 10/2000 | Bernacki ........................ 359/618 |
| 7,471,435 | B2 | * | 12/2008 | Modavis ........................ 359/227 |
| 8,599,301 | B2 | * | 12/2013 | Dowski et al. ................ 348/340 |

FOREIGN PATENT DOCUMENTS

| JP | 11-231209 A | 8/1999 |
| JP | 2004-536341 | 12/2004 |
| JP | 2005-215225 | 8/2005 |
| JP | 2005-215225 A | 8/2005 |
| JP | 2005-266096 A | 9/2005 |
| WO | WO 2013/161767 A1 | 10/2013 |

OTHER PUBLICATIONS

Office Action issued Mar. 4, 2014 in Japanese Patent Application No. 2012-130955 (with English language translation).
Office Action mailed Dec. 2, 2014 in Japanese Patent Application No. 2012-130955 (with English translation).

* cited by examiner

*Primary Examiner* — Mohammed Hasan
(74) *Attorney, Agent, or Firm* — Oblon, Spivak, McClelland, Maier & Neustadt, L.L.P.

(57) ABSTRACT

An optical module comprises an apodizer includes a black resin layer having a concavity the diameter of which gradually changes in a direction light passes through the apodizer, and, provided in the concavity, a transparent resin layer having the same refractive index as the black resin layer, the black resin layer and the transparent resin layer having a total thickness of 0.001 to 0.10 mm, an input lens opposed to the black resin layer of the apodizer and an output lens opposed to the transparent resin layer of the apodizer.

3 Claims, 7 Drawing Sheets

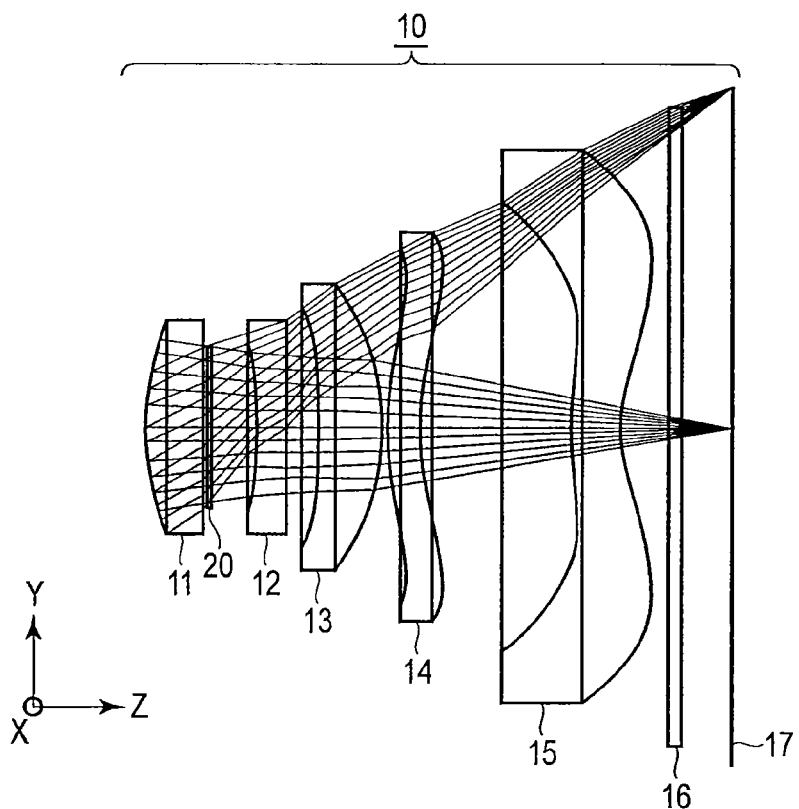
F I G. 1
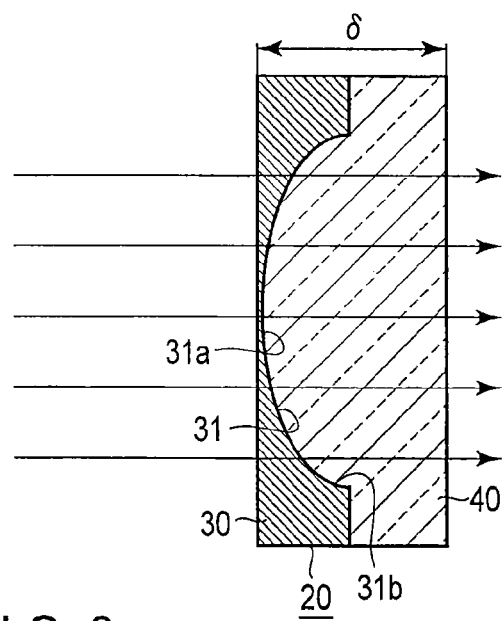
F I G. 2

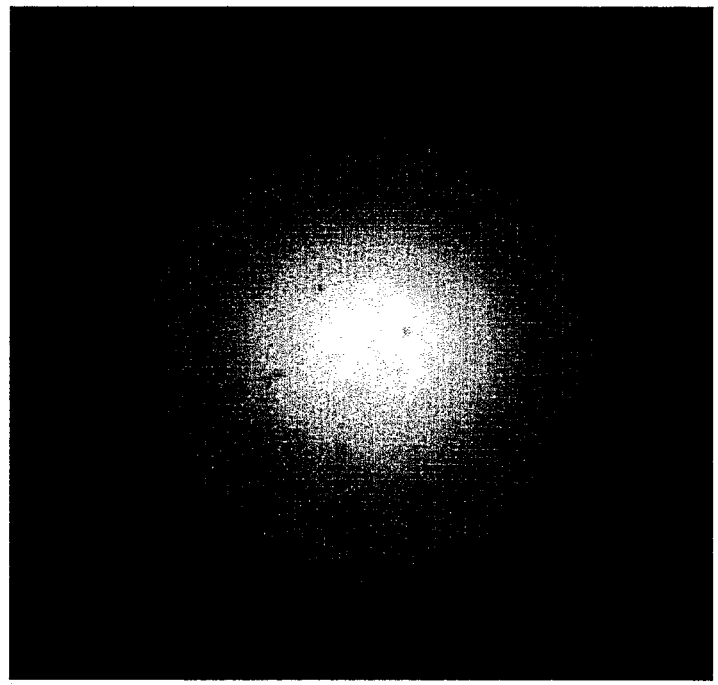
F I G. 3

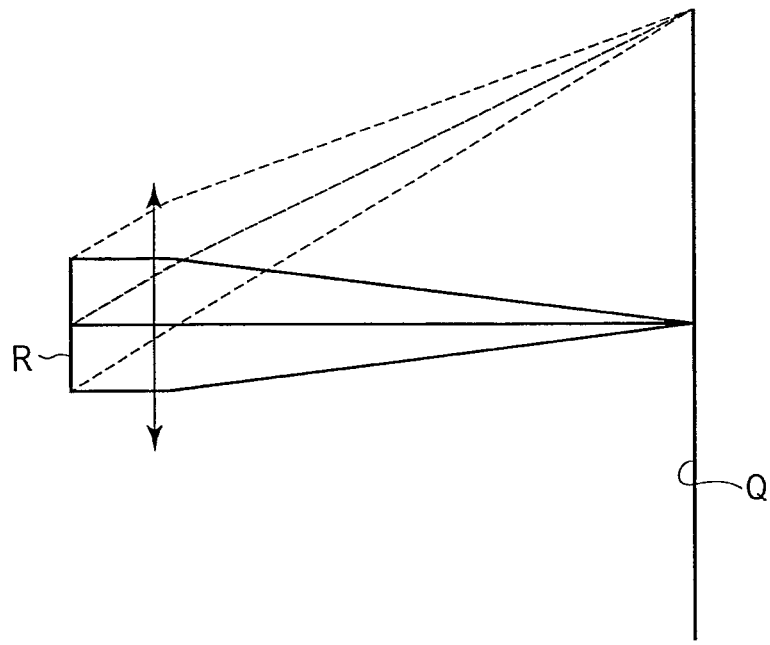
F I G. 5
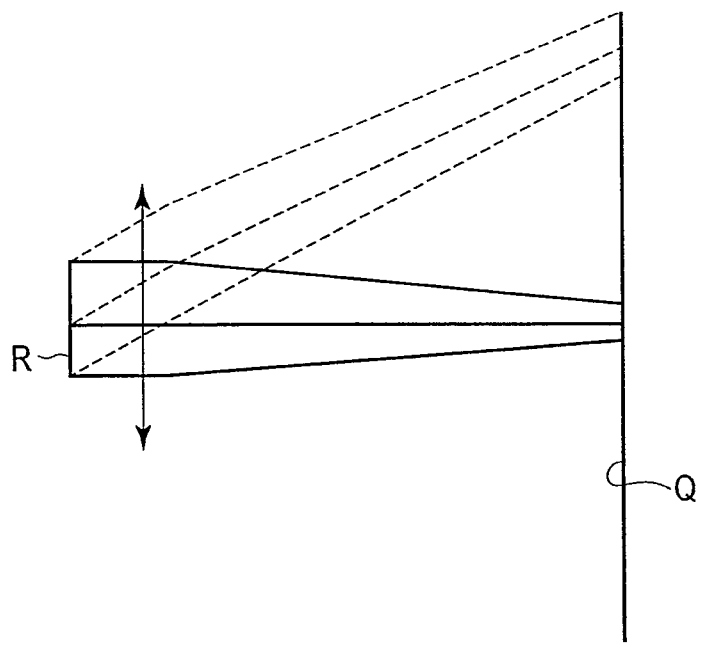
F I G. 6

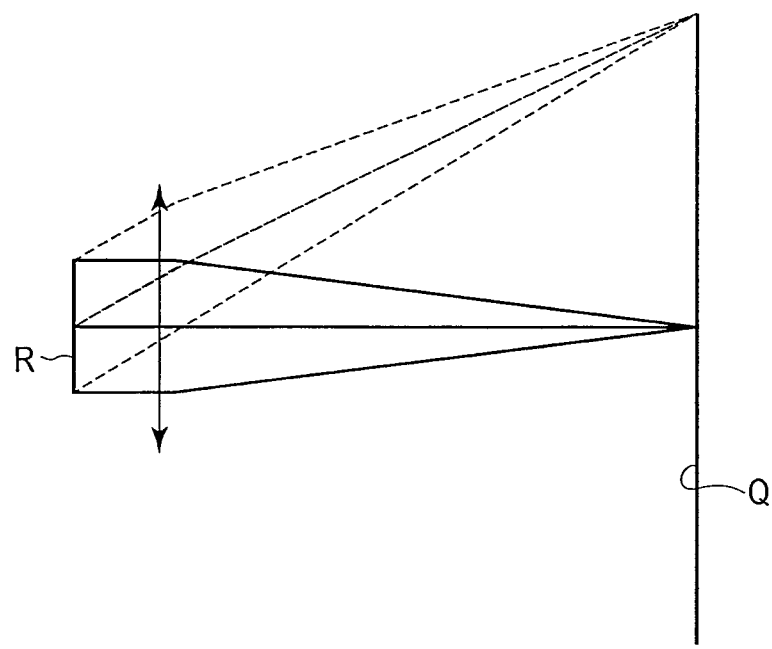
F I G. 7
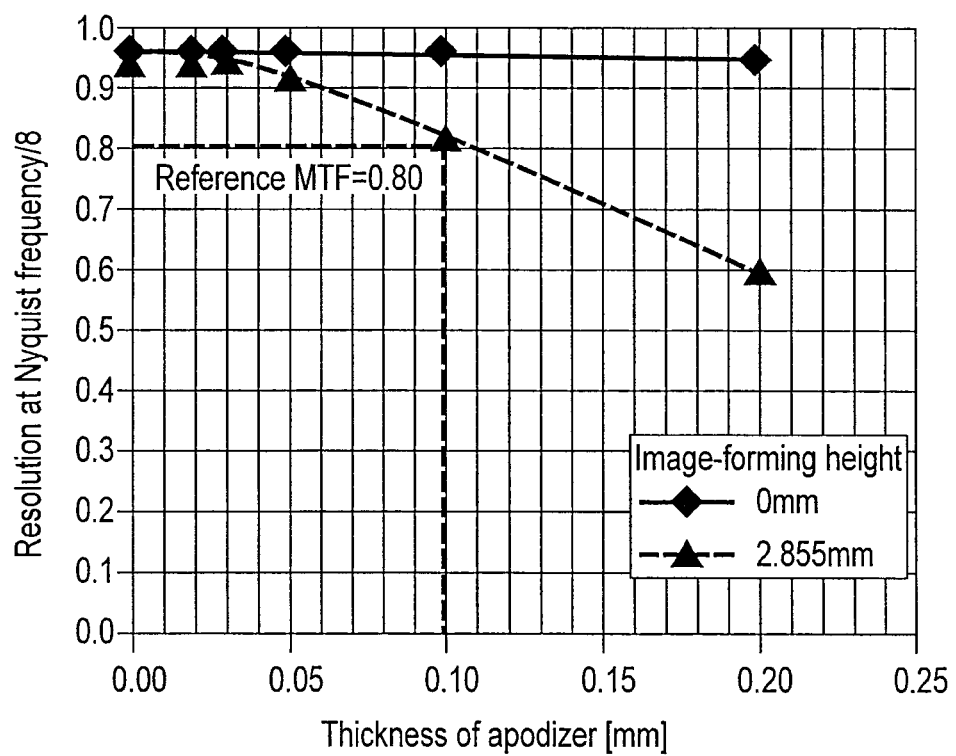
F I G. 8

METHOD OF MANUFACTURING AN APODIZER, AND OPTICAL MODULE

CROSS-REFERENCE TO RELATED APPLICATIONS

This application is based upon and claims the benefit of priority from Japanese Patent Application No. 2012-130955, filed Jun. 8, 2012, the entire contents of which are incorporated herein by reference.

FIELD

Embodiments described herein relate generally to a method of manufacturing an apodizer for use in optical apparatuses, and to an optical module utilizing the apodizer.

BACKGROUND

It is demanded that the optical module incorporated in any camera for use in mobile telephones should be thin. In recent years, the imaging device has come to have more and more pixels to increase the image quality. As the size of each pixel decreases, the depth of field decreases. To increase the depth of field, an optical mask is used.

A technique called apodization is known, whereby an optical mask is provided. In apodization, a filter having transmittance high at center and gradually decreasing toward the periphery is arranged, as optical mask, at the input pupil of an optical module to enhance the image contrast. Apodization reduces high-order diffracted light, increasing the contrast of low-frequency waves. On the other hand, the contrast of high-frequency waves is decreased. The optical filer used in apodization is called an apodizer.

FIG. 10 is a sectional view schematically showing an example of an apodizer. This apodizer H is composed of a transparent part H1 and a black part H2, which are combined together.

In the apodizer of this structure, the film-thickness distribution controls the transmittance. Light is inevitably refracted at the interface between the black part and the air layer. Consequently, the resolution will decrease even if the depth of field increases. Further, if the apodizer is made thicker in the direction the light passes through it, the resolution will decrease.

The apodizer may be manufactured by, for example, bonding a plano-concave lens made of light-absorbing glass and a plano-convex lens made of transparent glass, thereby decreasing the optical power to almost zero. The optical characteristics this apodizer exhibits if incorporated in an optical system are known. A method of manufacturing an apodizer is also known, in which a light-absorbing material is vacuum-deposited through a conical mask member, gradually increasing the optical density of the apodizer, from the optical center toward the periphery.

Any image-forming optical system that incorporates such an apodizer is difficult to make small, the filter being thick because a plano-concave lens of light-absorbing glass and a plano-convex lens of transparent glass are bonded together to constitute the apodizer. Further, the transmittance distribution is difficult to control accurately in the apodizer, because the apodizer has been made by vacuum-depositing a light-absorbing material through a conical mask member. Still further, the vacuum deposition must be performed for a long time to achieve the optical density required, inevitably increasing the cost of manufacturing the apodizer.

BRIEF DESCRIPTION OF THE DRAWINGS

FIG. 1 is a diagram schematically showing an optical module according to an embodiment of this invention;

FIG. 2 is a schematic sectional view showing an apodizer incorporated in the optical module;

FIG. 3 is a plan view showing the apodizer;

FIG. 5 is a diagram showing the advantage of the optical module;

FIG. 6 is a diagram showing the advantage of the optical module;

FIG. 7 is a diagram showing the advantage of the optical module;

FIG. 8 is a graph showing the thickness-resolution relationship of the optical module;

DETAILED DESCRIPTION

Figure 4A:
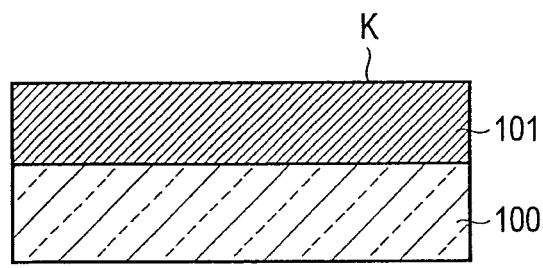
FIG. 4A is a schematic sectional view showing a step of manufacturing the apodizer.

A method of manufacturing an apodizer, according to an embodiment, comprises: applying black resin to a flat upper surface of a support table, forming a black resin layer of a prescribed thickness; moving a convex transparent jig toward the support table, pressing the black resin layer to an upper surface thereof; applying ultraviolet light from the transparent jig to the black resin layer; moving the transparent jig from the black resin layer, making a concavity in the black resin layer; applying transparent resin having the same refractive index as the black resin, forming a transparent resin layer on the black resin layer; moving a transparent plate toward the support plate, pressing the transparent resin layer; applying ultraviolet light from above the transparent layer to the transparent resin, curing the transparent resin; and removing the black resin from the support table.

An optical module according to an embodiment comprises: an apodizer comprising a black resin layer having a concavity the diameter of which gradually changes in the direction light passes through the apodizer, and, provided in the concavity, a transparent resin layer having the same refractive index as the black resin layer, the black resin layer and the transparent resin layer having a total thickness of 0.001 to 0.10 mm; an input lens opposed to the black resin layer of the apodizer; and an output lens opposed to the transparent resin layer of the apodizer.

Embodiments will be described in detail, with reference to the accompanying drawings.

FIG. 1 is a diagram schematically showing an optical module 10 according to an embodiment of the present invention. FIG. 2 is a schematic sectional view showing an apodizer 20 the optical module 10 incorporates. FIG. 3 is a plan view showing the apodizer 20. In FIG. 1 and FIG. 2, light passes through the module 10 and apodizer 20 from left to right. In FIG. 1, X, Y and Z indicate three directions orthogonal to one another. Direction Z is the direction in which light travels, passing through the apodizer 20.

The optical module 10 comprises an optical lens (input-side lens) 11, an apodizer 20, an optical lens (output-side lens) 12, optical lenses 13, 14, 15 and 16, and an imaging element 17, which are sequentially arranged from left to right in FIG. 1. The optical module 10 has the function of focusing an input image on the imaging element 17.

The apodizer 20 comprises a black resin layer 30 and a transparent resin layer 40. The black resin layer 30 has a concavity 31 the diameter of which gradually changes in the direction light travels through the layer. The transparent resin layer 40 is fitted in the concavity 31 of the black resin layer 30, and is made of ultraviolet-curable transparent resin having the same refractive index as the black resin layer 30. The total thickness δ of the black resin layer 30 and transparent resin layer 40 is 0.001 to 0.10 mm, measured in the direction light passes through the black resin layer 30 and transparent resin layer 40.

The thickness of the black resin layer 30 gradually decreases toward the bottom 31a of the concavity 31. Further, the black resin layer 30 has the highest transmittance at the center as shown in FIG. 3, and its thickness gradually increases toward its periphery 31b. Hence, the black resin layer 30 has transmittance gradually increasing toward the center.

Optical lens (input-side lens) 11 is arranged, opposing the black resin layer 30 of the apodizer 20. Optical lens (output-side lens) 12 is arranged, opposing the transparent resin layer 40 of the apodizer 20.

FIG. 4A, FIG. 4B, FIG. 4C, FIG. 4D, FIG. 4E, FIG. 4G and FIG. 4F are sectional views, schematically showing the steps of manufacturing an apodizer.

Figure 4B:
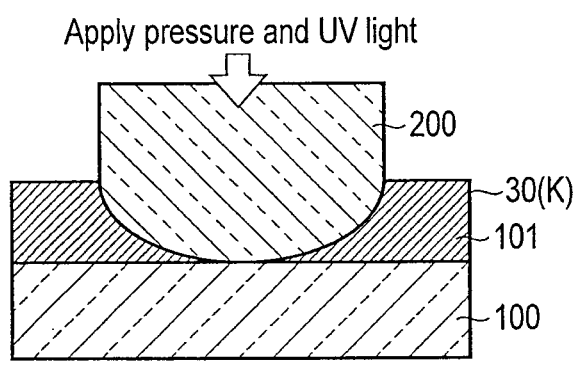
FIG. 4B is a schematic sectional view showing a step of manufacturing the apodizer.
Figure 4C:
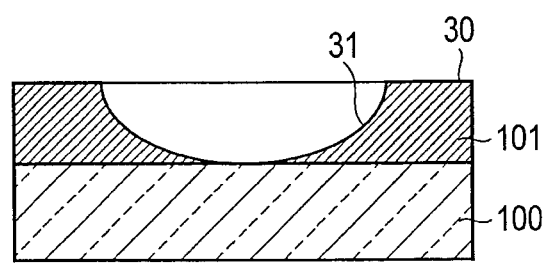
FIG. 4C is a schematic sectional view showing a step of manufacturing the apodizer.

As shown in FIG. 4A, black resin K not cured yet is applied to the upper flat surface 110 of a support table 100, forming a black resin layer 30(K) having a prescribed thickness. Then, as shown in FIG. 4B, a convex transparent jig 200 is move down, pressing the black resin layer toward the support table 100. At this point, the distal end of the transparent jig 200 abuts on the upper surface 101 of the support table 100. Ultraviolet light is applied to the black resin K, curing the same. A black resin layer 30 is thereby formed. The transparent jig 200 is moved up from the support table 100. As a result, the black resin layer 30 has a concavity 31 as shown in FIG. 4C.

Figure 4D:
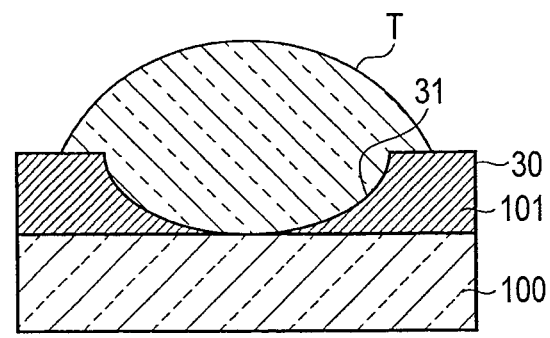
FIG. 4D is a schematic sectional view showing a step of manufacturing the apodizer.

Next, as shown in FIG. 4D, transparent resin T is applied to the concavity 31 and to the upper surface of the black resin layer 30.

Figure 4E:
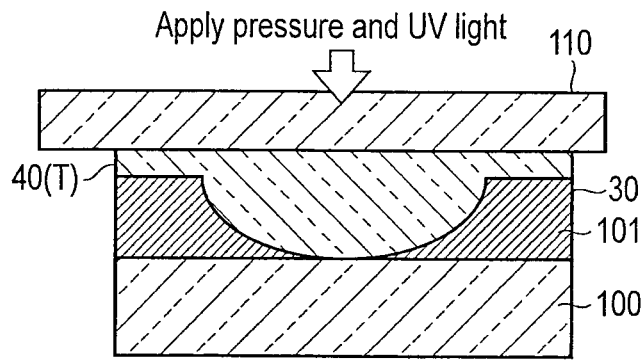
FIG. 4E is a schematic sectional view showing a step of manufacturing the apodizer.

As shown in FIG. 4E, a plate-shaped transparent jig 110 is moved down toward the support table 100, pressing the transparent resin T. Then, ultraviolet light is applied to the transparent resin T through the transparent jig 110, thereby curing the transparent resin T. As a result, a transparent resin layer 40(T) is formed. The transparent resin layer 40T is made integral with the black resin layer 30. As the transparent resin T is cured, the transparent resin layer 40T tends to warp. Nonetheless, the layer 40T maintains its shape because it is clamped between the support table 100 and the transparent jig 110.

Figure 4F:
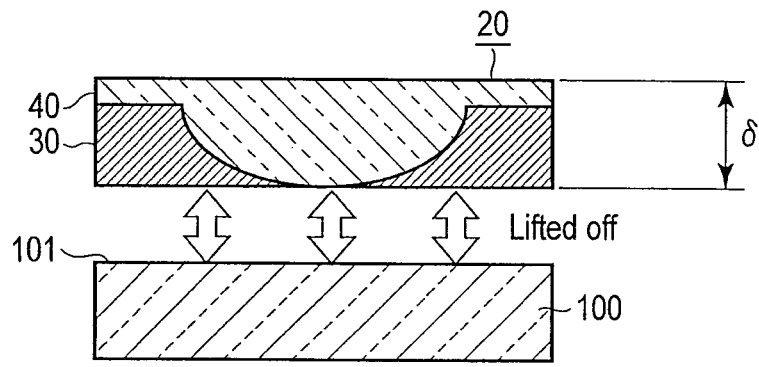
FIG. 4F is a schematic sectional view showing a step of manufacturing the apodizer.
Figure 4G:
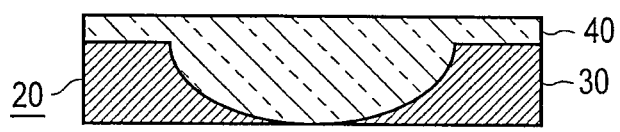
FIG. 4G is a schematic sectional view showing a step of manufacturing the apodizer.

Next, as shown in FIG. 4F, the black resin layer 30 and the transparent resin layer 40, integral with each other, are lifted off the support table 100. An apodizer 20 is thereby produced, as shown in FIG. 4G.

This method neither requires special apparatuses nor involves many steps, and so allows the apodizer 20 to be manufactured at low cost.

The optical module 10, which has the apodizer 20 configured and manufactured as described above, is advantageous in some respects. That is, the depth of field increases because of the function intrinsic to the apodizer 20. Further, the resolution increases, as will be explained with reference to FIG. 5 to FIG. 7. In FIG. 5 to FIG. 7, R indicates a real image, and Q indicates an image-forming plane.

FIG. 5 shows the image-forming ability the optical module 10 may have if it does not have the apodizer 20. The image-forming ability shown in FIG. 5 shall herein be regarded as reference ability. FIG. 6 shows the image-forming ability the optical module 10 may have if it has the conventional apodizer. In the conventional apodizer, light is refracted at the interface between the black part and the air layer, inevitably lowering the resolution as mentioned above.

As shown in FIG. 7, the light is not refracted if the apodizer according to the embodiment is used. This is because the black resin layer 30 contacts the transparent resin layer 40 and the resin layers 30 and 40 have the same refractive index. Therefore, the resolution does not decrease.

The relationship the thickness of the apodizer 20 has with the resolution (MTF) will be explained. If the thickness of the apodizer 20 described above is changed from 0.001 to 0.20 mm, adjusting the image-forming position with respect to the optical axis of the image-height center, the MTF will decrease at a position where the image-forming height is large as shown in FIG. 8. In this case, the MTF at Nyquist frequency/8 is greater than or equal to 0.80, as seen from FIG. 8, if the thickness of the apodizer 20 is 2.855 mm. It is therefore desired in that the apodizer 20 should be 0.001 to 0.10 mm thick in order not to decrease the resolution and in view of its structural limitation.

As described above, the method of manufacturing the optical module 10 and apodizer 20 according to this embodiment neither requires special apparatuses nor involves many steps, and so allows the apodizer 20 to be manufactured at low cost. Moreover, the apodizer 20 maintains high resolution since its thickness is limited.

Figure 9:
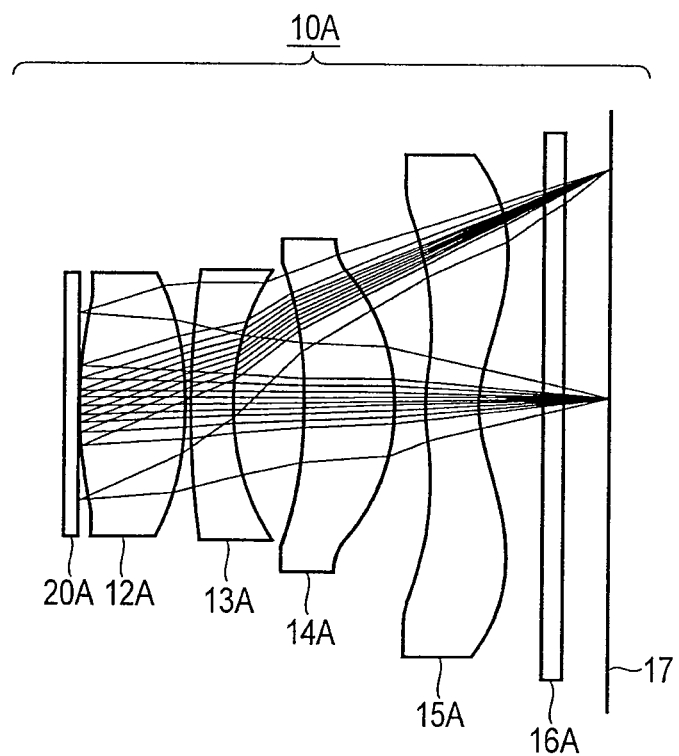
FIG. 9 is a diagram schematically showing an optical module according to an embodiment of this invention.
Figure 10:
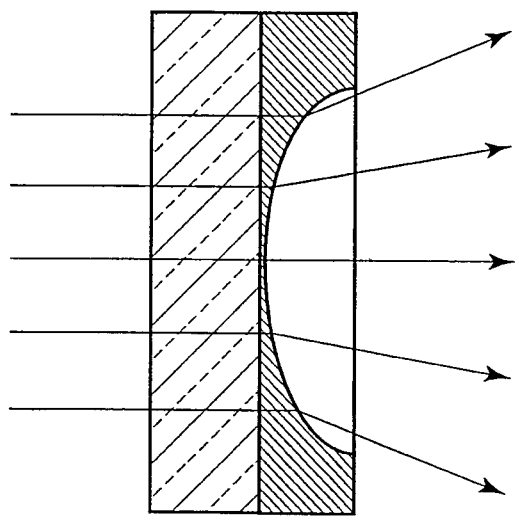
FIG. 10 is a sectional view showing an apodizer of ordinary type.

In some cases, the optical lens (input-side lens) 11 may be omitted as shown in FIG. 9.

The optical module 10A comprises, an apodizer 20A, an optical lens (output-side lens) 12A, optical lenses 13A, 14A, 15A and 16A, and an imaging element 17, which are sequentially arranged from left to right in FIG. 9. The optical module 10A has the function of focusing an input image on the imaging element 17.

The optical module 10A can be used with the same effect obtained by means of the optical module 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing an apodizer, comprising:
  applying black resin to a flat upper surface of a support table, forming a black resin layer of a prescribed thickness;

moving a convex transparent jig toward the support table, pressing the black resin layer at an upper surface thereof;

applying ultraviolet light from the transparent jig to the black resin layer;

moving the transparent jig from the black resin layer, making a concavity in the black resin layer;

applying transparent resin having the same refractive index as the black resin, forming a transparent resin layer on the black resin layer;

moving a transparent plate toward the support table, pressing the transparent resin layer;

applying ultraviolet light from above the transparent layer to the transparent resin, curing the transparent resin; and removing the black resin layer from the support table.

2. An optical module comprising:

an apodizer comprising a black resin layer having a concavity the diameter of which gradually changes in a direction light passes through the apodizer, and, provided in the concavity, a transparent resin layer having the same refractive index as the black resin layer, the black resin layer and the transparent resin layer having a total thickness of 0.001 to 0.10 mm;

an input lens opposed to the black resin layer of the apodizer; and an output lens opposed to the transparent resin layer of the apodizer.

3. An optical module comprising:

an apodizer comprising a black resin layer having a concavity the diameter of which gradually changes in a direction light passes through the apodizer, and, provided in the concavity, a transparent resin layer having the same refractive index as the black resin layer, the black resin layer and the transparent resin layer having a total thickness of 0.001 to 0.10 mm; and an output lens opposed to the transparent resin layer of the apodizer.

* * * * *